Jan. 23, 1940. W. SCRIMGEOUR 2,187,757
METHOD OF MANUFACTURING KITCHEN UTENSILS
Filed Feb. 1, 1938 2 Sheets-Sheet 1
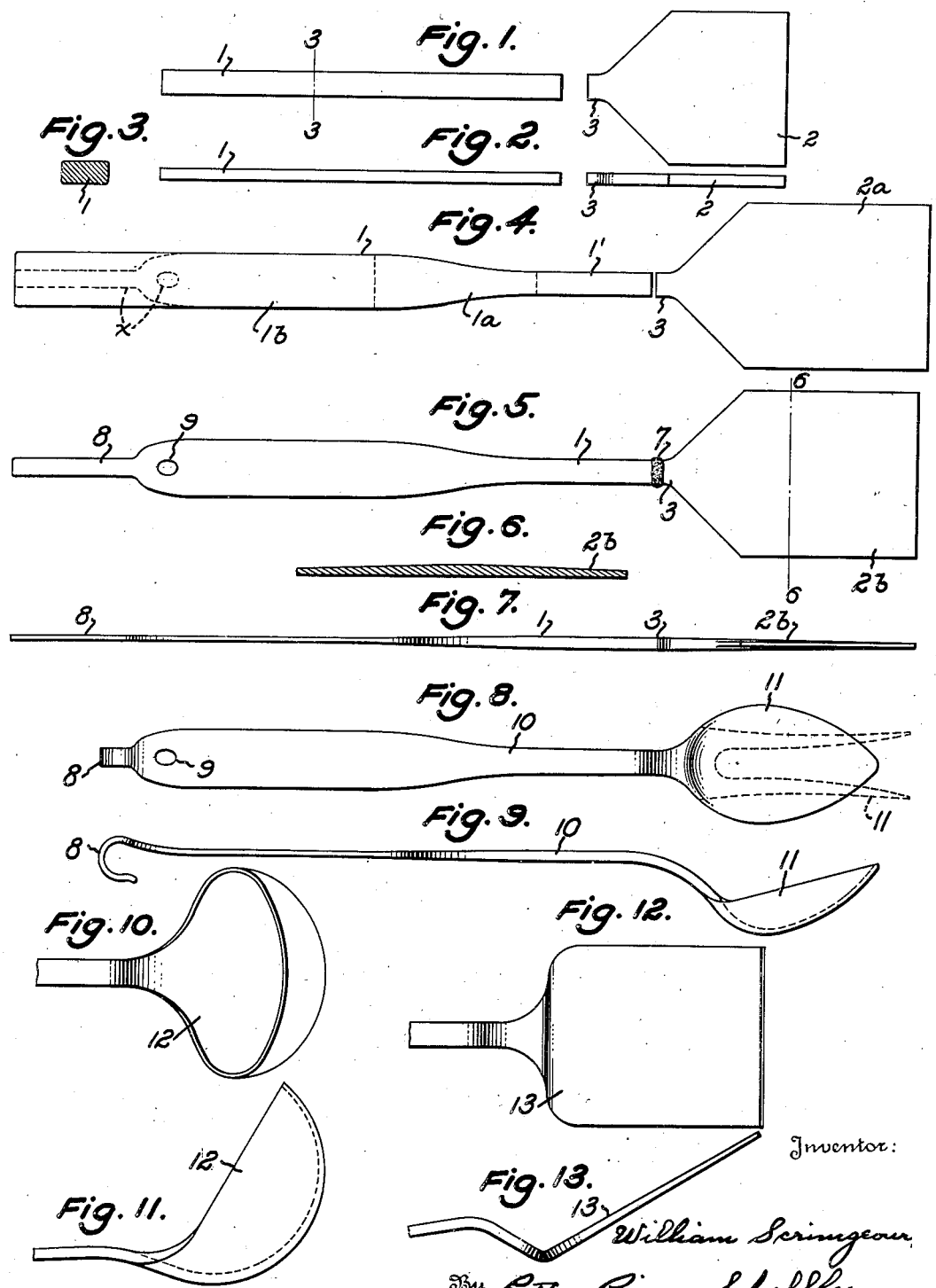

Jan. 23, 1940.     W. SCRIMGEOUR     2,187,757
METHOD OF MANUFACTURING KITCHEN UTENSILS
Filed Feb. 1, 1938      2 Sheets-Sheet 2
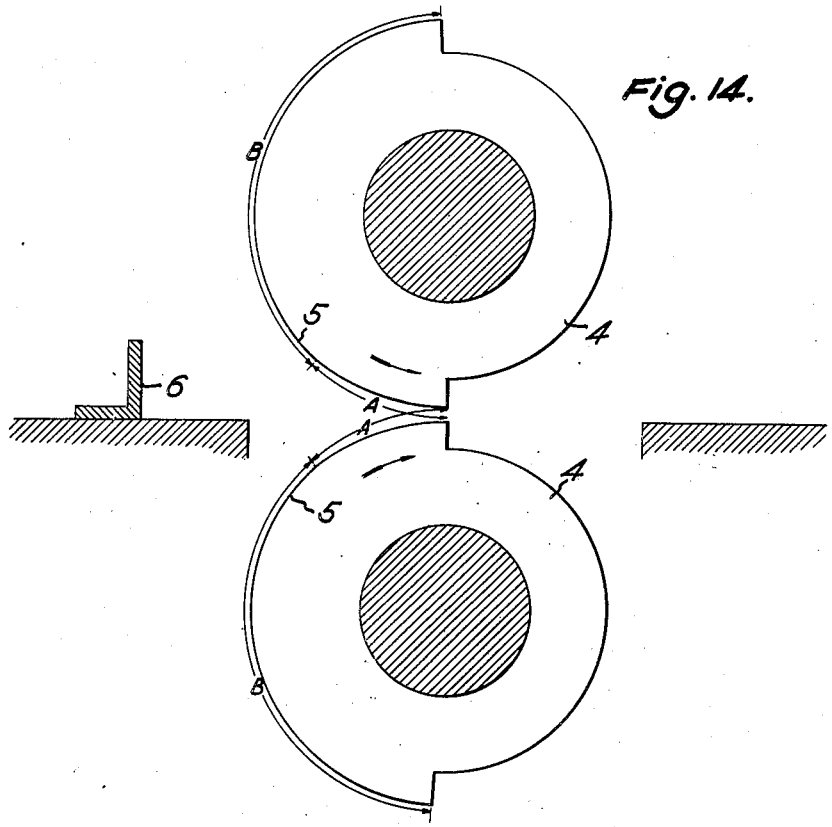
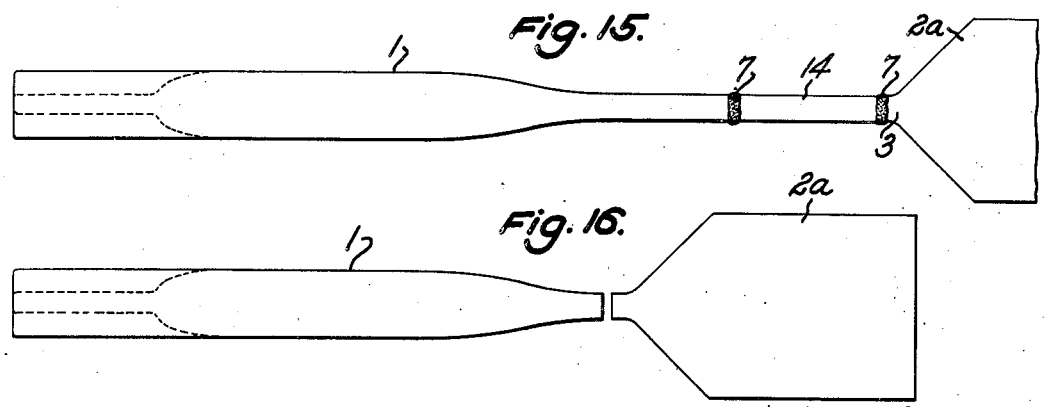
Inventor:
William Scrimgeour,
By Potter, Pierce & Scheffler,
Attorneys.

Patented Jan. 23, 1940

2,187,757

UNITED STATES PATENT OFFICE 2,187,757

METHOD OF MANUFACTURING KITCHEN UTENSILS

William Scrimgeour, Washington, D. C., assignor to William Scrimgeour, Engineer and Contractor, Washington, D. C., a partnership composed of William Scrimgeour, Lula McA. Scrimgeour, C. Maxwell Scrimgeour, and C. Bailey Scrimgeour Application February 1, 1938, Serial No. 188,211

6 Claims. (Cl. 76—105)

This invention relates to methods of manufacturing kitchen utensils, such as spoons, forks, ladles and the like.

Stainless steel has been used in the manufacture of pots, roasters and other articles for kitchen use but the prior methods of manufacturing spoons and other long handled articles from stainless steel have been expensive and, in general, have not produced highly satisfactory articles. The usual practice has been to die stamp a blank from a relatively thin sheet of stainless steel, and to press the blank to final shape. Separate dies were required for each handle length and the cost of the dies added materially to manufacturing costs. The deep longitudinal corrugation which was stamped in the handle to reinforce the thin metal was uncomfortable or painful to the hand when the utensils were tightly grasped. The other alternative of riveting wooden strips or other pads upon the thin metal handles was unsatisfactory as it was difficult to keep such composite articles clean.

Objects of this invention are to provide novel processes for manufacturing long handled kitchen utensils, the processes being characterized by the use of relatively heavy steel stock and the selective grading of the heavy stock to reduce the thickness where strength is not necessary. An object is to provide a process of manufacturing kitchen utensils from steel by cutting handle and head blanks from bar and thick sheet stock, grading the blanks except at the parts that are to be joined, welding the graded parts, die shaping the head blank to the desired utensil, and finishing the article by grinding or polishing. A further object is to provide a process, as stated above, by which the handle length of the finished article may be varied by cutting back a part of the ungraded section of a handle blank or by welding sections of the handle stock material between the graded handle and the graded head blanks.

These and other objects and advantages of the invention will be apparent from the following specification when taken with the accompanying drawings in which:

Fig. 1 is a plan view of a set of handle and head blanks;

Fig. 2 is a side elevation of the same;

Fig. 3 is an enlarged transverse section of the handle blank as seen on line 3—3 of Fig. 1;

Fig. 4 is a plan view of a set of graded handle and head blanks in position for welding;

Fig. 5 is a plan view of the welded assembly, and showing the end of the handle cut back for forming a hook;

Fig. 6 is a transverse section through the graded head blank on line 6—6 of Fig. 5;

Fig. 7 is a side elevation of the welded assembly after grinding off the weld but before the shaping of the head and handle;

Fig. 8 is a plan view of a finished kitchen spoon, the dotted lines indicating an alternative shaping of the blank of Fig. 7 to form a serving fork;

Fig. 9 is a side elevation of the kitchen spoon;

Figs. 10 and 11 are fragmentary plan and side elevations of a ladle;

Figs. 12 and 13 are fragmentary plan and side elevations of a cake turner;

Fig. 14 is a diagrammatic vertical section illustrating grading rolls for the formation of the graded handle;

Fig. 15 is a plan view of a utensil blank having an extra length handle; and

Fig. 16 is a similar view showing a utensil blank set for forming a short handled article.

In the drawings, the reference numeral 1 identifies a length of bar stock of steel that may be of round, oval or other cross-section but which is preferably substantially rectangular with rounded corners. The head blank is cut or stamped from heavy sheet stock of the same material and, preferably, of the same thickness as the bar stock of the handle. The head blank includes the main section 2 of approximately rectangular form which tapers down to a projecting portion 3 that is preferably of the same cross section as the handle blank 1.

The outer ends of the handle blanks are graded to reduce their thickness and to increase their width and length. Rolls 4, 4 for grading the handle blank 1, as shown in Fig. 14, have grading surfaces 5 which increase in diameter over the circumferential regions A and are cylindrical over the circumferential regions B. The maximum spacing of the grading surfaces is substantially equal to the thickness of the handle blank 1, and the stop 6 against which the blank is placed is substantially closer to the axial plane of the rolls than the length of the handle blank. The end portion 1' of blank 1 is not worked by the grading rolls, the portion 1a is worked by grading surfaces A of the rolls to decrease the thickness and increase the width of the blank, and the outer handle section 1b is worked by grading surfaces B to roll this portion to a wide thin strip.

The head blanks 2 may be longitudinally graded in similar rolls to form blanks 2a that decrease progressively in thickness towards their outer ends. Such blanks will be used for cake turners, forks and other utensils, but side grading to form blanks 2b, Figs. 5-7, is preferably employed when spoons, dippers, ladles and the like are to be formed.

The graded handles and graded heads are then butt welded, as indicated by the weld metal 7 in Fig. 7 to form blanks that may be used in forming various types of utensils. Sound welds which develop substantially the full strength of the metal are easily and economically made by the customary processes and apparatus. The same welding apparatus or jigs may be used for all utensils when the weld is made before the head blank is die stamped to final shape but some or all of the shaping operations may be effected before the welding operation.

The outer end of the handle blank is cut and/or punched along dotted lines $x$ of Fig. 4 to form a narrow hook extension 8 and an opening 9 for hanging the utensils upon wires and hooks.

The general shape of the finished handle of various types of utensils will be substantially identical with that of the handle 10 of the serving spoon shown in Figs. 8 and 9. The bowl 11 of the serving spoon grades in thickness from its central plane towards the side edges, and from the handle to the tip of the spoon. As indicated by dotted lines in Fig. 8, the same side-graded head blank may be used in the formation of a serving fork 11.

The side-graded blanks are preferably used for such relatively large bowled utensils as dippers, ladles, skimmers and the like. A ladle 12 of graded cross-section is shown in Figs. 10 and 11. Longitudinally graded head blanks are used for cake turners 13 and similar articles but may be used for deep bowled utensils where maximum strength is not essential.

The handle and head blanks may be graded either before or after the parts are welded to each other. Handles of different desired lengths may be made from handle blanks of different lengths or, alternatively, sections of bar stock may be added to or cut from handle blanks of a single pre-selected length when longer or shorter handles are desired. Long handles are formed from stock graded blanks by welding sections 14 of the original handle stock between the ends of the handle blank and the projection 3 of the graded head blank, Fig. 15. Handles of less than the usual standard length may be made by cutting off a part of the inner end of the graded handle blank, Fig. 16. The butt welds are readily made since the parts to be joined have the same cross-section at each weld and therefore all may be made under the same working conditions.

The utensils are finished by grinding to remove any irregularities and polishing. Some of the grinding operations, for example, the grinding of the hook ends of the handles, may be performed before the utensil is stamped into its final form.

The invention reduces the cost of manufacture of any one utensil of a given size and handle length, and this advantage of economy in production increases materially when various types of utensils are to be made in the same or in different handle lengths. The prior processes required a separate die for stamping a complete blank for each utensil and for each handle length in the same type of utensil. Only a single and relatively small die for each utensil type is required by the present process as the handles for all utensil types and sizes are made from bar stock and welded to the head blanks. The finished articles are substantially stronger than those made from the thin sheet steel of the prior art but the power required for the die punching operations is far less than that previously required. Only the thin outer end of the handle blank is punched to form the hook and hole, and the head blanks are graded to thin sections, commensurate with those of prior practice, before the head blanks are punched.

It has been customary to flare the outer ends of the handles or to build up the handle thickness but an investigation of utensils of about 12 inch length and longer has shown that the flat parallel-sided handle is more convenient and comfortable to the hand and that the length of the handle has little or no influence upon the shaping of the handle cross-section for maximum comfort. Handles having an outer portion about one inch wide and about $\frac{3}{32}$ inch thick are quite satisfactory as to comfort and convenience in use, and stainless steel provides ample strength for this cross-section. Steels such as the 18% chromium-8% nickel type have been used but other steels or alloys that may be punched and rolled could be employed.

The invention is not limited to any particular dimensions but the following data is given as illustrative of appropriate dimensions. An overall length of 14 inches for the finished articles was adopted as the "standard" size for general manufacture. The handle blanks were cut from rectangular bar stock about ½ inch wide and $\frac{3}{16}$ inch thick. The inner end section 1', Fig. 4, was about 2 inches long after the grading operation, the cross-section changed progressively to a width of 1 inch and thickness of $\frac{3}{32}$ inch in a flared section 1a about 2½ inches long, and this section was continued through the end section 1b of the blank. The 12 inch length utensils can be made, as indicated in Fig. 6, by cutting off the ungraded inner end section 1', or the length may be increased by inserting the additional bar stock 14 between the handle and head blanks. The head blanks were cut from $\frac{3}{16}$ inch strips or plates.

The invention is particularly useful when stainless steel utensils are to be manufactured but it will be apparent that the invention is not limited to a particular material for the stock.

I claim:

1. In the manufacture of kitchen utensils from steel, the process which comprises cutting off a length of bar stock of uniform transverse cross-section, working down said length of bar stock to form a handle blank having a thin relatively wide outer end and a thicker narrow inner end, forming a steel head blank with an inner end of substantially the thickness of the inner end of the handle blank, working the head blank to reduce the thickness towards the outer edge thereof, butt welding the inner ends of said blanks to each other, shaping the head blank to the size and form of a utensil, and surface finishing the assembly to smooth the weld joint and irregularities.

2. In the manufacture of kitchen utensils from steel, the process which comprises longitudinally grading a piece of bar stock of initially uniform transverse cross-section to form a handle blank having a thin relatively wide outer end and a thicker narrow inner end, providing a flat head blank having an inner projection of substantially the thickness of and for attachment to the inner end of the handle blank, grading the head blank to reduce the thickness towards the outer edge, butt welding the blanks to each other, die stamping the head blank to the shape and form of a utensil, and grinding the assembly to smooth the weld joint and irregularities.

3. In the manufacture of kitchen utensils, the process as claimed in claim 2 in combination with the step of side grading the head blank to provide a thick central section tapering to thin side edges.

4. In the manufacture of kitchen utensils, the process as claimed in claim 2, in combination with the step of welding between the handle and head blanks an extension blank of substantially the same cross-section as the inner end of the handle blank, thereby to provide a long handled utensil.

5. In the manufacture of kitchen utensils, the process which comprises cutting from a steel plate a head blank of approximately rectangular form terminating in a narrow centrally located projection at one end for attachment to a handle blank, working the head blank to reduce the thickness thereof from its central section towards its side edges, working a handle blank of steel bar stock of initially uniform transverse cross-section to form a thin and relatively wide outer section merging through an intermediate flaring section into a narrow and thick inner end section of substantially the thickness of the projection of the head blank, and butt welding the inner end of the handle blank to the projection of the head blank.

6. In the manufacture of kitchen utensils, the process which comprises cutting from a steel plate a head blank of approximately rectangular form terminating in a narrow centrally located projection at one end for attachment to a handle blank, working the head blank to reduce the thickness thereof from the projection end thereof towards its outer end, working a handle blank of steel bar stock of initially uniform transverse cross-section to form a thin and relatively wide outer section merging through an intermediate flaring section into a narrow and thick inner end section of substantially the thickness of the projection of the head blank, and butt welding the inner end of the handle blank to the projection of the head blank.

WILLIAM SCRIMGEOUR.